United States Patent
Bates et al.

(10) Patent No.: US 6,530,801 B2
(45) Date of Patent: Mar. 11, 2003

(54) BLIND MATING HIGH DENSITY FIBER OPTIC CONNECTORS

(75) Inventors: Charles Linsday Bates, Laguna Hills, CA (US); Peter Joseph Hyzin, Trabuco Canyon, CA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 09/835,148

(22) Filed: Apr. 13, 2001

(65) Prior Publication Data

US 2002/0151207 A1 Oct. 17, 2002

(51) Int. Cl.⁷ .................................................. H01R 13/627
(52) U.S. Cl. ...................... 439/364; 439/359; 385/56; 385/53
(58) Field of Search ................. 439/364, 145, 439/359; 385/59, 60, 77; 350/96.22, 96.21

(56) References Cited

U.S. PATENT DOCUMENTS

| | | | |
|---|---|---|---|
| 3,951,514 A | 4/1976 | Medina, Jr. .................. 350/96 |
| 4,076,379 A | 2/1978 | Chouinard ............... 350/96.22 |
| 4,082,421 A | 4/1978 | Auracher et al. ......... 350/96.22 |
| 4,140,366 A | 2/1979 | Makuch et al. .......... 350/96.22 |
| 4,140,367 A | 2/1979 | Makuch et al. .......... 350/96.22 |
| 4,182,546 A | 1/1980 | Lukas et al. ............. 350/96.21 |
| 4,277,135 A | 7/1981 | Schrott et al. ........... 350/96.21 |
| 4,483,575 A | * 11/1984 | Kruger et al. ................. 339/14 |
| 5,120,243 A | * 6/1992 | Mee ........................... 439/243 |
| 5,133,032 A | 7/1992 | Salter et al. .................... 385/60 |
| 5,265,182 A | 11/1993 | Hartley ........................... 385/77 |
| 5,266,047 A | * 11/1993 | Black et al. ................. 439/364 |
| 5,283,848 A | 2/1994 | Abendschein et al. ......... 385/59 |
| 5,386,486 A | 1/1995 | Fan et al. ....................... 385/59 |
| 5,590,229 A | 12/1996 | Goldman et al. ............. 385/59 |
| 5,689,598 A | 11/1997 | Dean, Jr. et al. .............. 385/59 |
| 5,778,121 A | 7/1998 | Hyzin .......................... 385/55 |
| 5,836,787 A | * 11/1998 | Kodama ..................... 439/567 |
| 5,898,807 A | 4/1999 | Welsh .......................... 385/56 |

* cited by examiner

*Primary Examiner*—P. Austin Bradley
*Assistant Examiner*—Alexander Gilman
(74) *Attorney, Agent, or Firm*—Roger C. Turner

(57) ABSTRACT

Front and rear optical fiber connectors (12, 14) can be mated and unmated from the front, while the rear connector and the rear portion (54) of the front connector can be removed for cleaning and replacement from the rear. A jackscrew (30) with a handle (32) at the front, extends through the connectors and has a threaded rear end (34) for engaging a nut (36) on the rear connector. The jackscrew also can be operated from the rear to remove the rear connector for maintenance. A spring (182) urges the jackscrew forwardly, to allow a person to sense when the jackscrew has not engaged the nut. A front connector frame (50) has a vertical divider (200) forming a pair of cavities (62, 63) that receive shaped body elements (54, 55). U-shaped brackets (164, 166) hold a back plate (52) to each connector. Alignment pins (144, 146) are coupled through springs (320) to the rear connector.

11 Claims, 10 Drawing Sheets

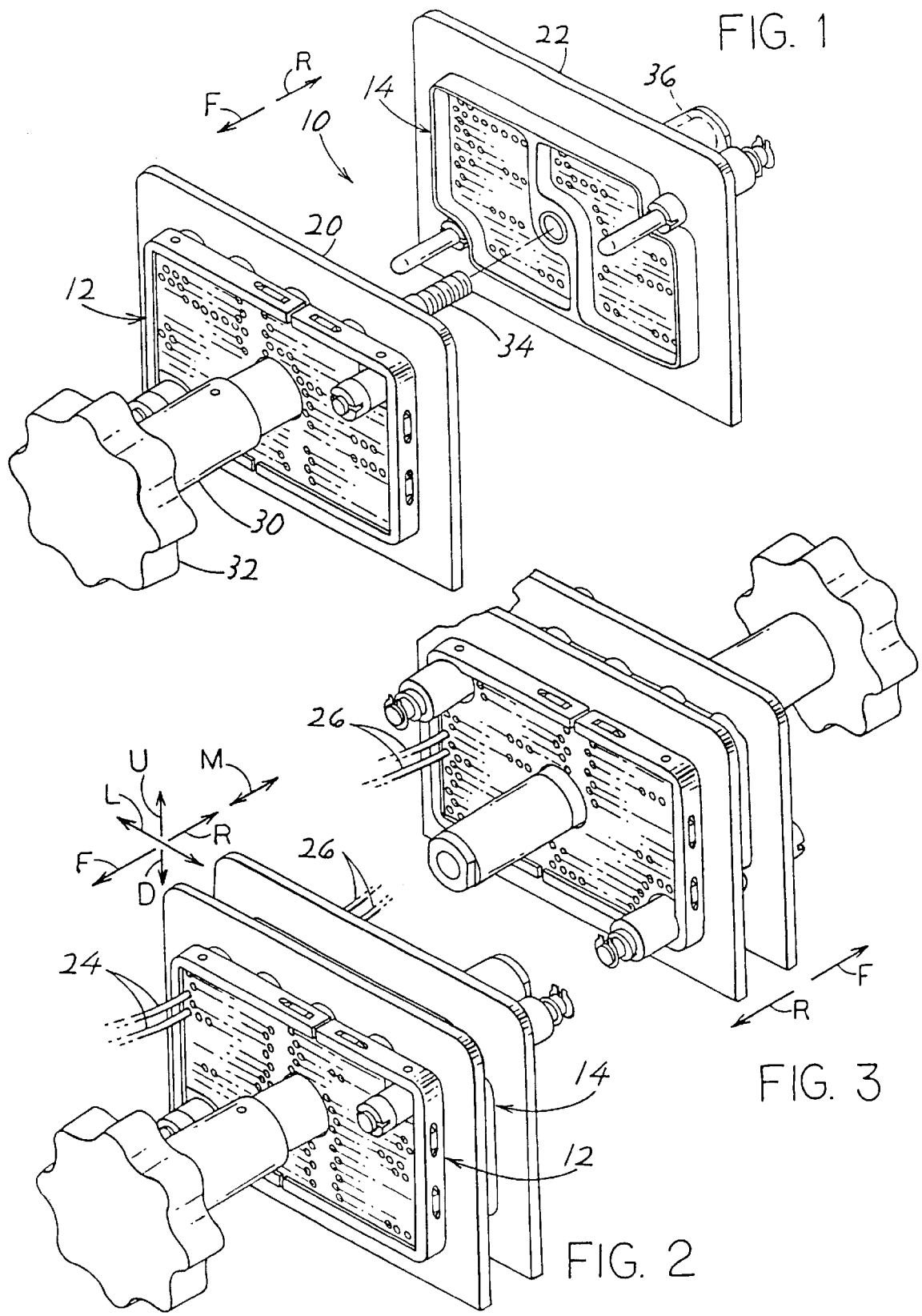

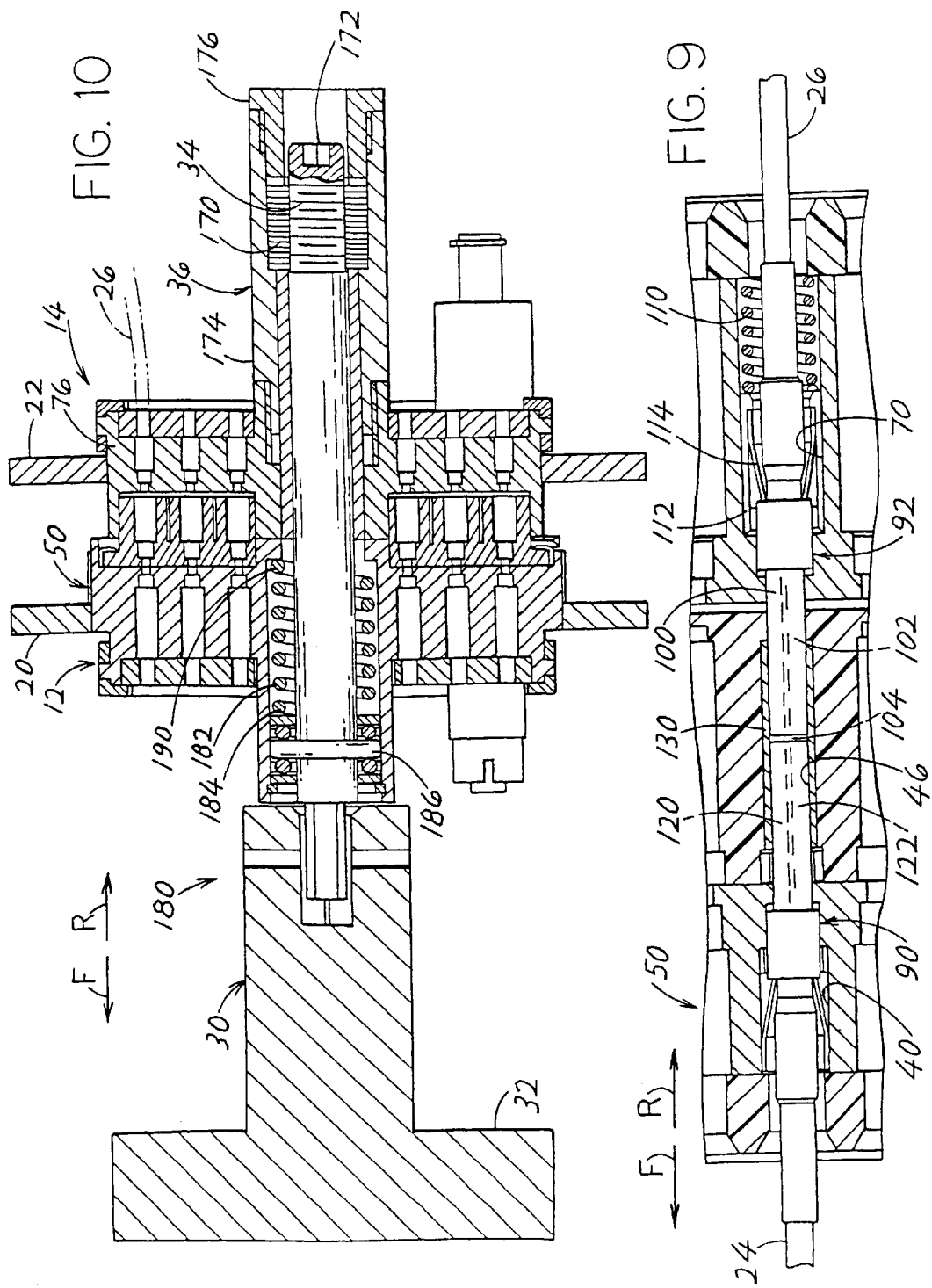

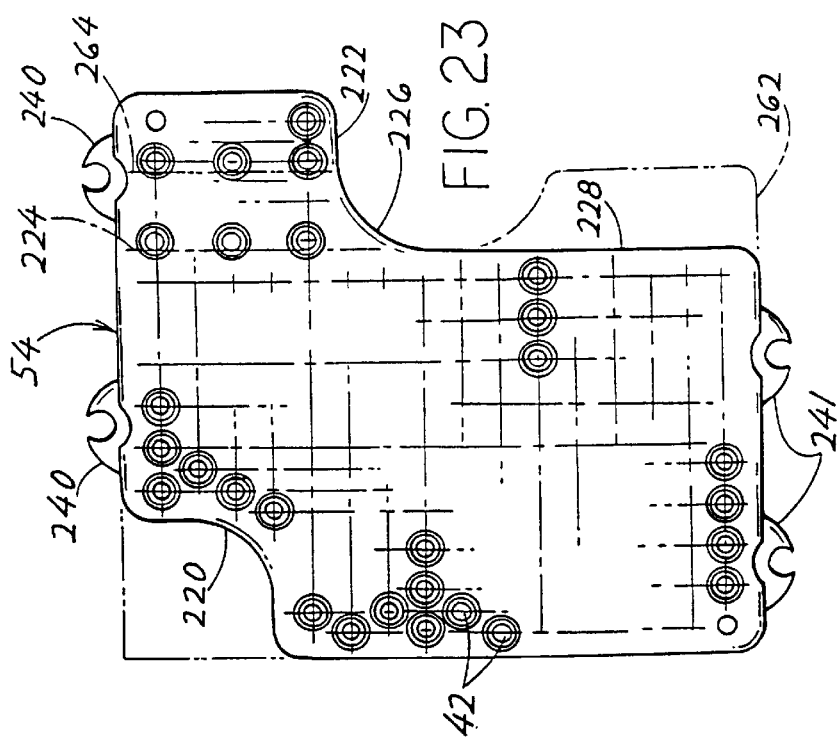
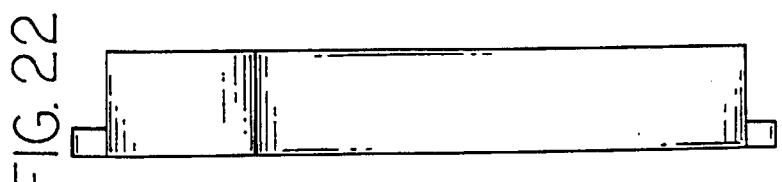
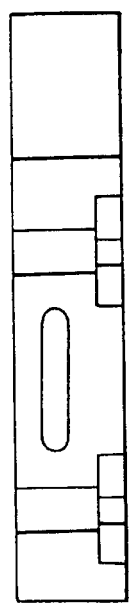
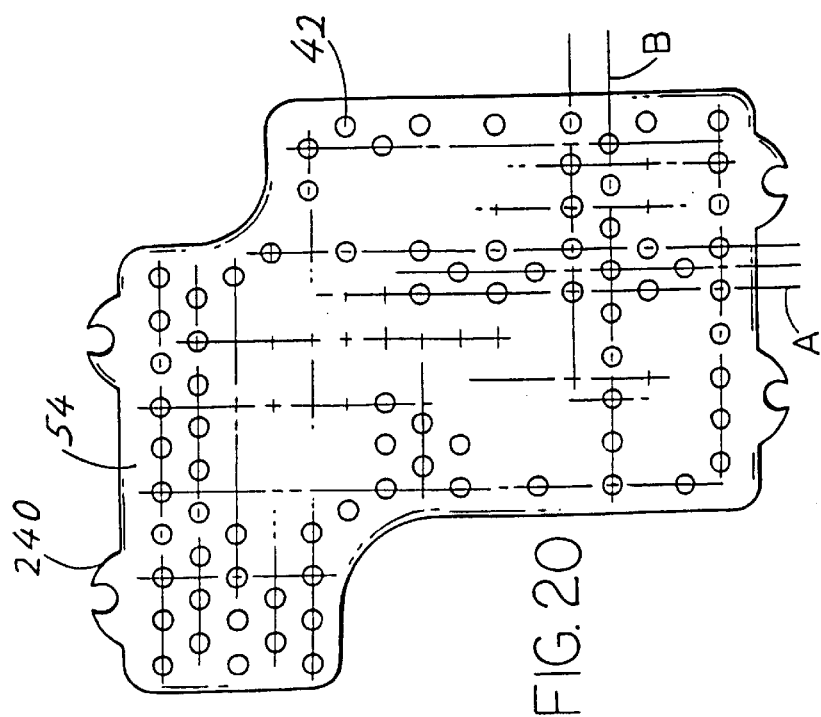

BLIND MATING HIGH DENSITY FIBER OPTIC CONNECTORS

BACKGROUND OF THE INVENTION

Present fiber optic connector systems commonly include 2 to 12 fiber-holding passages. As the number of fibers to be connected and disconnected increases, there is a demand for high density connectors that may have hundreds of optical fibers. The connector should be of minimum size so a connector arrangement occupies a minimum of available space.

Another requirement for optical connectors is ease of accessibility for maintenance. Present devices generally require the entire connector to be removed in order to clean a suspect fiber, or to clean all ferrules, fiber tips and alignment sleeves. The connectors are generally mounted in a drawer and cabinet environment, where there is blind engagement and disengagement of the connectors. It is desirable if an operator is given feedback indicating that the connectors are or are not mated when attempts are made to accomplish such mating or unmating.

SUMMARY OF THE INVENTION

In accordance with one embodiment of the present invention, an optical fiber connector assembly is provided that includes front and rear connectors that each have a plurality of passages arranged in rows and columns, which facilitates blind mating and unmating of the connectors from the front of the assembly, and removal of the rear connector and a portion of the front connector from the rear of the assembly for maintenance. A jackscrew extends through bores at the middle of the connectors, with the jackscrew having a threaded rear end and with a rear connector having a threaded nut for receiving the jackscrew. This allows the jackscrew to be turned to move the connectors together and apart. The jackscrew has a rear end formed to engage a wrench to enable a technician to turn the jackscrew from a location rearward of the rear connector. A spring biases the jackscrew forwardly, so if the jackscrew is turned in an attempt to thread it into the nut but it does not threadably engage the nut, the spring pushes the jackscrew forward to indicate to the operator that the threads have not been engaged.

The front connector has a front frame with numerous passage parts and with a pair of rearwardly-opening cavities. A pair of body elements with a plurality of passage parts, each fits into one the cavities. The front frame has a divider lying about half-way between opposite sides of the frame and between the cavities, with the divider having a wide middle region and thinner vertically-extending top and bottom divider parts. Each divider part extends from a side of the middle region to the top and bottom, respectively, of the frame. The frame and body elements have projections at their top and bottom walls that have screw holes for holding the body elements to the frame, with the screws having rear ends that can be engaged by a screwdriver for rapid removal of the body elements.

Back plates on the front and rear frames, are held in place by largely U-shaped brackets that fit over projections on the top and bottom frame walls. Each bracket has a flange that lies against the back face of a back plate.

A pair of alignment pins for aligning the front and rear connectors as they mate, are fixed to a mount wall. A spring lying against each alignment pin and against the rear connector, urges the rear connector rearwardly to push it rearward as the jackscrew is loosened.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded front isometric view of an optical fiber connector assembly of the present invention, showing the front and rear connectors prior to their mating, with each connector mounted on a mount wall.

FIG. 2 is a view similar to that of FIG. 1, but with the front and rear connectors fully mated.

FIG. 3 is a rear isometric view of the connector of FIG. 2.

FIG. 9 is an enlarged view showing a pair of termini of the connector of FIG. 8.

FIG. 10 is a sectional view of the mated connectors of FIG. 2, showing the jackscrew.

FIG. 20 is a front elevation view of a body element of the front connector of FIG. 2.

FIG. 21 is a plan view of the body element of FIG. 20.

FIG. 22 is a side elevation view of the body element of FIG. 20.

FIG. 23 is a front elevation view of the body element of FIG. 20.

DESCRIPTION OF THE PREFERRED EMBODIMENTS

Figure 4:
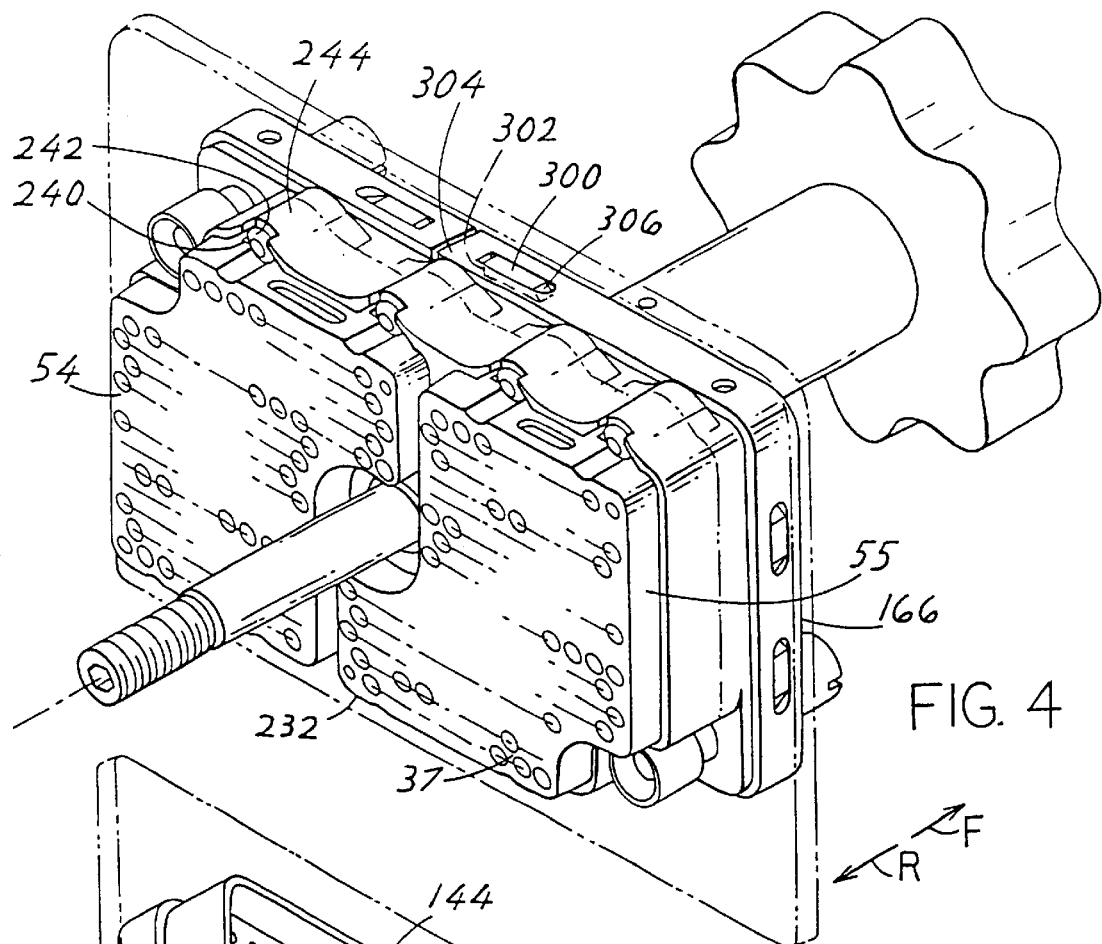
FIG. 4 is a rear isometric view of the front connector, with the mount wall shown in phantom lines.

FIG. 1 illustrates an optical fiber connector assembly 10 which includes front and rear connectors 12,14. The connectors are shown fixed to mount walls 20, 22, with the front mount wall 20 commonly being the rear wall of a drawer and the rear mount wall 22 commonly being a cabinet wall. The walls 20, 22 are seldom moved apart or closer together. In normal use, the front and rear connectors are mated, as shown in FIGS. 2 and 3, to couple optical cables 24, 26 that extend respectively forward F and rearward R from the connectors. The forward and rearward directions are longitudinal directions M which are perpendicular to lateral directions L and up and down directions U, D.

Figure 5:
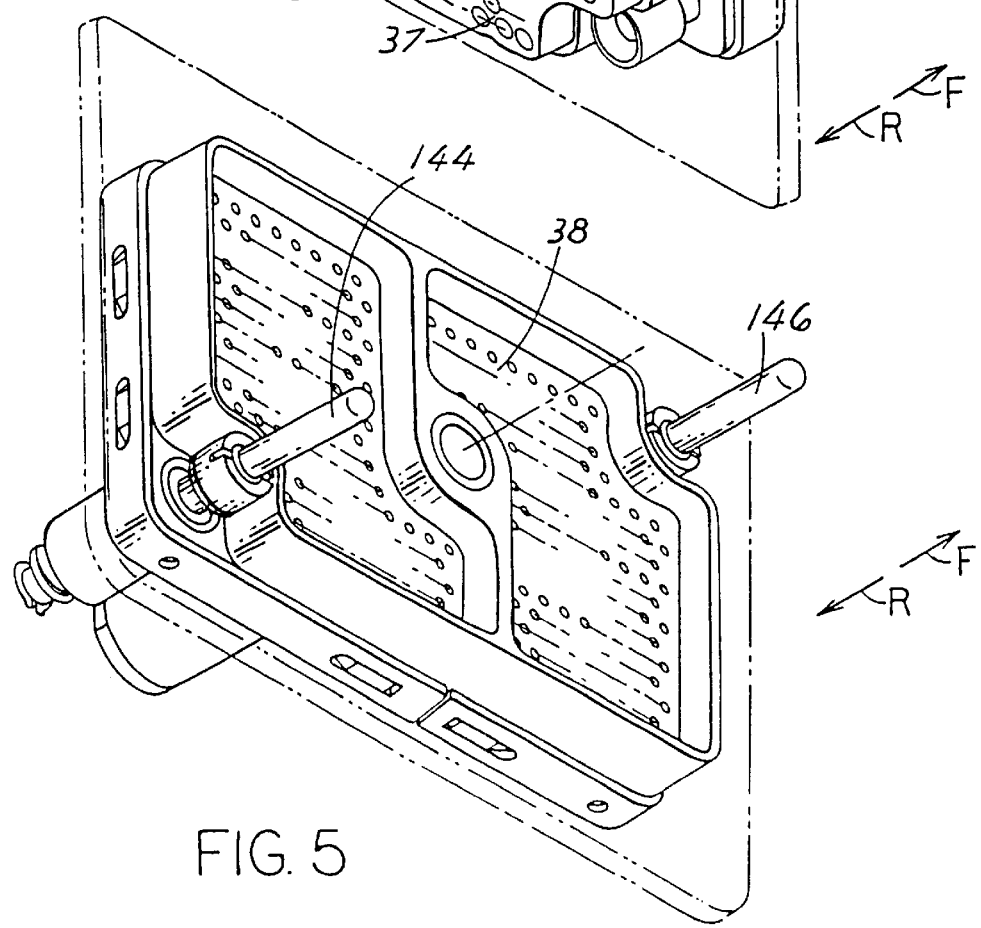
FIG. 5 is a front isometric view of the rear connector, with the mount wall shown in phantom lines.

Occasionally, the connectors must be unmated, which is accomplished by turning a jackscrew 30 (FIG. 1) as by turning its handle 32 to unthread a rear end 34 from a threaded nut part 36 on the rear connector. In some cases, the jackscrew is turned through a gear train or the like, and there is no handle on the jackscrew. At times, it is desirable to clean areas near the mating tips of the optical fibers of the cables and the tip areas of ferrules that surround the fibers, as well as to clean alignment sleeves. This is accomplished by a technician operating from the rear of the rear connector 14. FIGS. 4 and 5 show the mating faces 37, 38 of the front and rear connectors.

Figure 8:
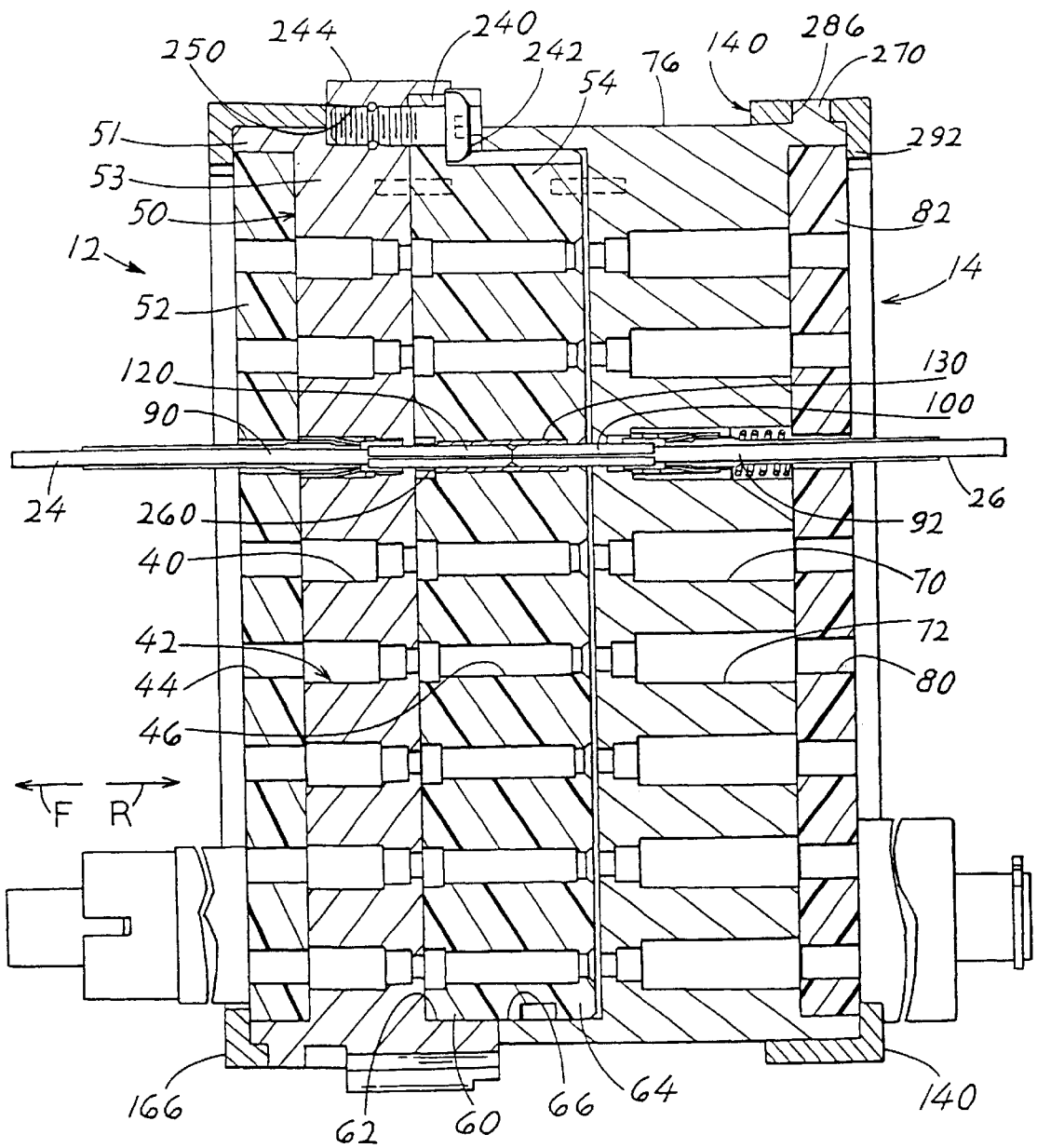
FIG. 8 is a sectional view of the fully mated connectors of FIG. 3.

FIG. 8 shows details of the front and rear connectors 12, 14, showing them fully mated. The front connector has a plurality of passages 40 that include passage parts 42, 44 and 46. Each passage part 42 lies in a frame 50 that includes a shell portion 51 and body portion 53. The shell and body portions are integral in the illustrated connector. Each passage part 44 lies in a back plate 52 that is mounted on the frame to prevent loss of termini. Each passage part 46 lies in an insert or body element 54 whose front end 60 lies in a cavity 62 at the rear of the frame, and whose rear end 64 projects into a cavity 66 of the rear connector.

The rear connector 14 has a plurality of passages 70 with a passage part 72 lying in a rear frame 76 and with a passage part 80 lying in a back plate 82 at the rear of the rear frame.

A pair of termini 90, 92 are used to couple the optical fibers of a pair of optical cables 24, 26, the termini lying in a pair of aligned passages 40, 70 of the front and rear connectors.

FIG. 9 shows details of the two termini 90, 92 that lie in the two passages 40, 70. The rear terminus 92 includes a ferrule 100 that surrounds the optical fiber 102 of the cable, including the tip 104 of the fiber. A spring 110 biases the ferrule 100 and the fiber therein forwardly, while a pair of clips 112, 114 transmit forces from the spring to the ferrule. The front terminus 90 is similar, except that is does not have a spring, although it has a ferrule 120 that surrounds a fiber 122 of the cable 24. The two ferrules 100, 120 are precisely aligned by an alignment sleeve 130 that lies in the passage part 46. The sleeve is commonly formed of a ceramic tube that has a slot extending along its entire length to allow the tube to expand slightly as the ferrules are inserted.

Figure 6:
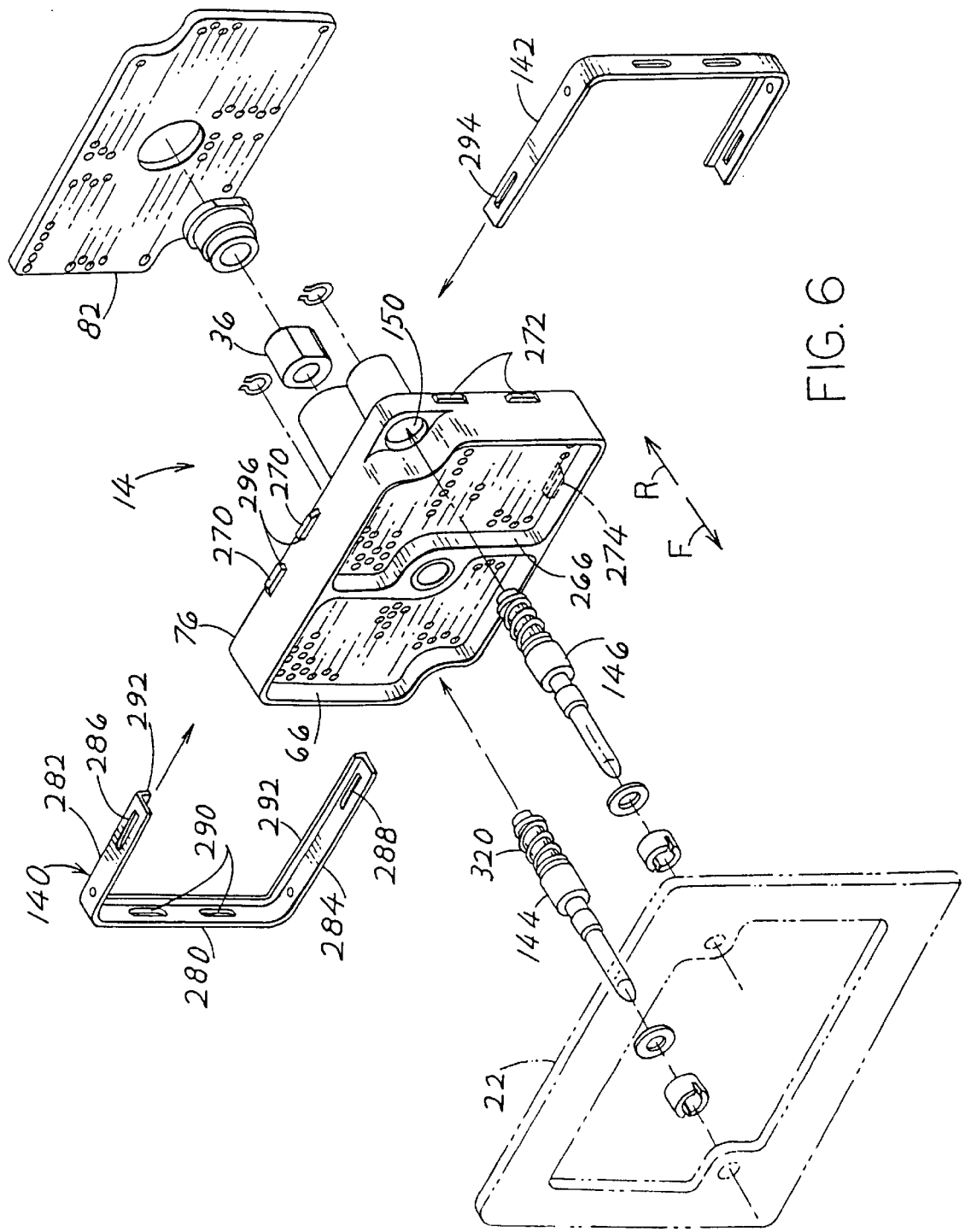
FIG. 6 is an exploded front isometric view of the rear connector of FIG. 1.

FIG. 6 shows details of the rear connector 14 showing the rear frame 76 with its forwardly-opening cavity 66 and showing the back plate 82. FIG. 6 also shows a pair of brackets 140, 142 that hold the back plate 82 on the rear frame 76. The figure also shows a pair of alignment pins 144, 146 that fit into alignment bores 150 on the rear frame 76 and into alignment bores 152 (FIG. 7) on the front frame 50 to align the two connectors.

Figure 7:
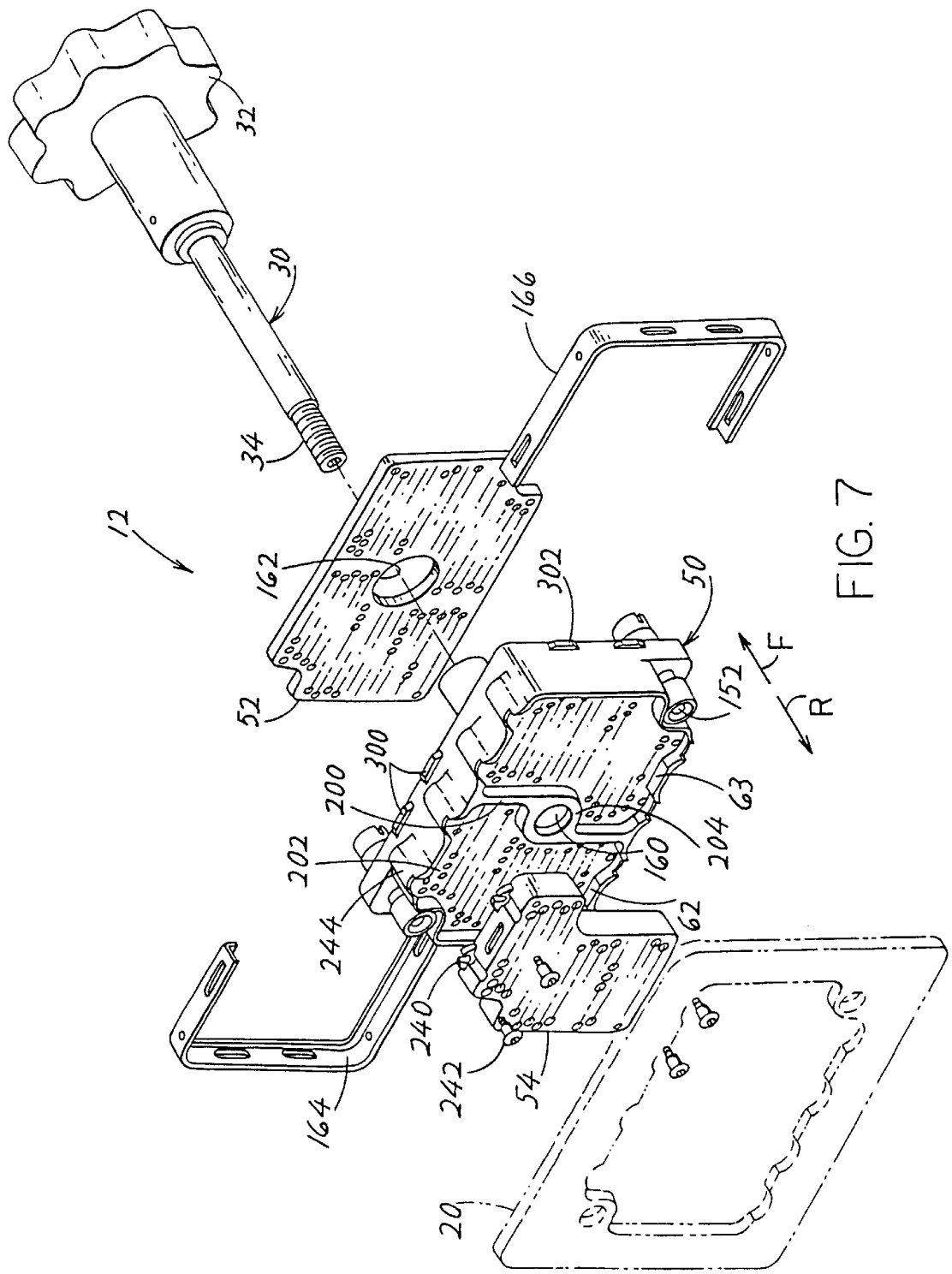
FIG. 7 is an exploded rear isometric view of the front connector of FIG. 1.

FIG. 7 shows that the front connector frame 50 and back plate 52 have aligned bores or holes 160, 162 to pass the jackscrew 30. The figure shows one of two body elements 54 that each can be partially inserted in one of the two cavities 62, 63 of the frame. The figure also shows a pair of brackets 164, 166 that hold the back plate 52 to the front frame 50. The mount wall 20 is shown in phantom lines.

FIG. 10 shows some details of the jackscrew 30 and the nut 36 that it screws into to move the front connector forward to mate the connectors, and rearward to unmate the connectors. The nut 36 includes a nut part 170 with internal threads, that can threadably engage the threaded end 34 of the jackscrew. The threaded end 34 of the jackscrew has a hexagonal socket 172 for receiving a hex wrench. This allows a technician to turn the jackscrew from the rear end of the connector assembly 10. The nut part 170 lies at the rear of a sleeve 174 that extends rearwardly from the rest of the rear connector. The sleeve holds the nut part 170 a distance rearward of the connector, so a technician can easily move apart the rear optic cables 26 in order to gain access to the socket 172 to turn the jackscrew. Instead of a hexagonal socket, a different noncircular exposed surface can be used that can be turned by a wrench. A rear end cap 176 holds the nut part 170 in place.

The jackscrew assembly 180 includes a helical compression spring 182 with a front end 184 that presses against washers and a flange 186 on the jackscrew 30. The spring has a rear end 190 that presses against the frame 76 of the rear connector to push the rear connector rearwardly. When the front and rear connectors are separated but are to be mated, and a person pushes forwardly against the jackscrew handle 32 while turning it, the threaded rear end 34 of the jackscrew will normally engage the nut part 170. Further turning of the jackscrew will move the connectors together to their fully mated position. However, if the threaded end 34 does not threadably engage the nut part 170, then repeated turning of the handle 32 will not move the connectors together. Then, when the person stops turning the handle 32 and releases it, the handle will suddenly move forward, indicating to the person that the jackscrew did not threadably engage the nut and the connectors are not mated. This is important when the mount walls 20, 22 or any other barrier prevents the person who is turning the jackscrew handle, from directly viewing the rear connector 14 to see if it is moving.

Figure 12:
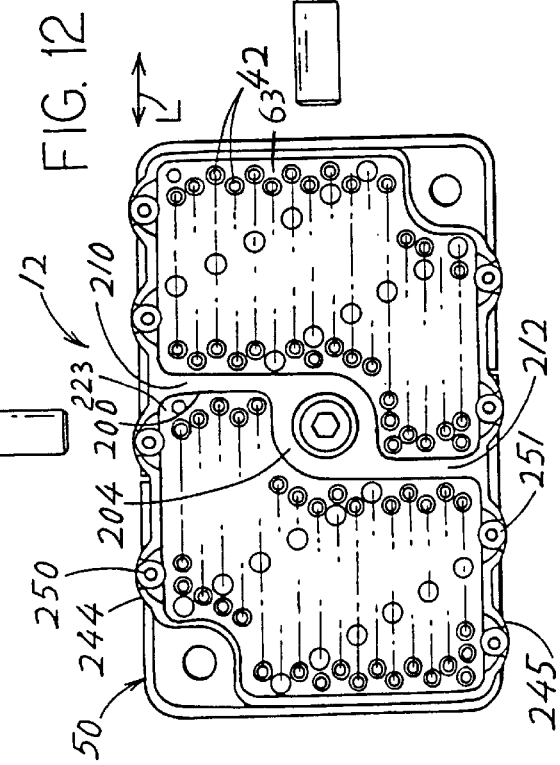
FIG. 12 is a rear elevation view of the front connector, including the jackscrew.
Figure 19:
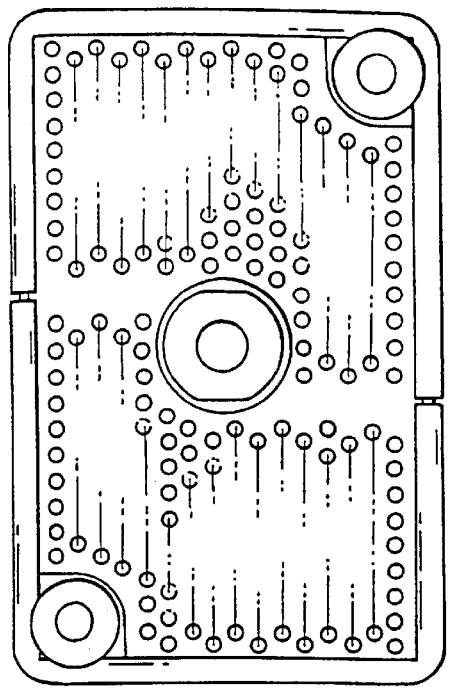
FIG. 19 is a rear elevation view of the rear connector of FIG. 17.
Figure 18:
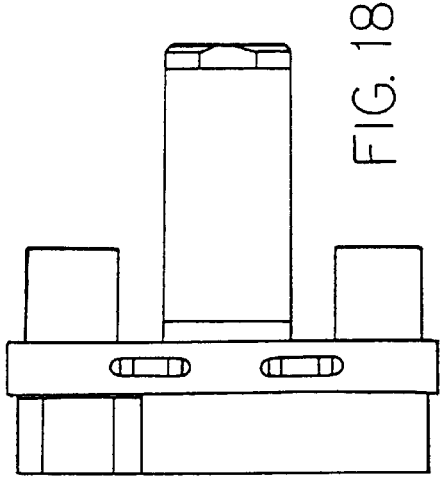
FIG. 18 is a side elevation view of the rear connector of FIG. 16.

FIG. 7 shows that the rear end of the front frame 50 has a divider 200 that divides the cavity arrangement 202 into the two cavities 52, 63. The divider has an enlarged center region 204 that forms the bore 160 through which the jackscrew extends. As shown in FIG. 12, the divider 200 has vertically extending top and bottom divider pans 210, 212. The divider parts 210, 212 have less than half the thickness in the lateral direction L as the center region 204. The top divider part 210 extends upwardly from the right side of the center region 204, while the bottom divider part 212 extends downwardly from the left side of the center region 204, when viewed in a forward direction as in FIG. 12. This results in the body elements such as 54 FIG. 23, having a generally rectangular shape with a recess at 220 to accommodate one of the areas that receives am alignment pin. Also, the body element has a cutout at 226 to receive the enlarged center region and a cutout at 228 for the downward divider part. The body element has a projection 222 opposite the cutout, the projection fitting into a recess 223 (FIG. 12) that lies beside a divider part 210 that separates the cavities 62, 63 and the project-extending laterally beyond an adjacent side 227 of the middle region. FIG. 23 shows the leftward body element 54, when viewing its rear surface. The projection 222 projects from the upper part of the imaginary rectangle 224, with the projection 222 extending rightward to the top divider part shown at 120 in FIG. 12. The other body element, which is the left body element shown at 55 in FIG. 4, is of identical shape, but is turned upside down so its projection 232 projects leftward against the bottom divider part.

FIG. 7 shows that the body element 54 has a pair upward, or outward (away from the center of the cavity 62) projections 240 that are designed to receive screw fasteners 242.

The frame has a plurality of upwardly, or outwardly, extending frame projections such as 244 with threaded holes that receive the screws 242. FIG. 4 shows the body element 54 fully installed, with a pair of screws 242 extending through upward projections 240 of the body element and into holes in upward shell projections 244. FIG. 23 shows that the body element 54 has two upper projections 240 at its top and two lower projections 241 at its bottom, that each is designed to receive a screw. FIG. 12 shows that the front frame 50 has a pair of upper frame projections 244 that each includes a threaded hole 250, and that the bottom of the frame has a pair of bottom frame projections 245 that each has a threaded hole 251.

As shown in FIG. 8, after the rear connector 14 is moved rearwardly away from the front connector 12, a technician can unscrew the screws such as 242 to remove the body elements such as 54, all from the rear of the front connector frame 50. Upon removal of the rear connector, the tip of the rear ferrule 100 is exposed and can be cleaned. Upon removal of the body element 54, the alignment sleeves 130 are accessible. Also, upon removal of the body element 54, the tip of the front ferrule 120 is exposed and can be cleaned.

It is noted that the alignment sleeve 130 is shown held in place by retainers 260. It is also possible to have a split in each body element, with front and rear parts.

Figure 16:
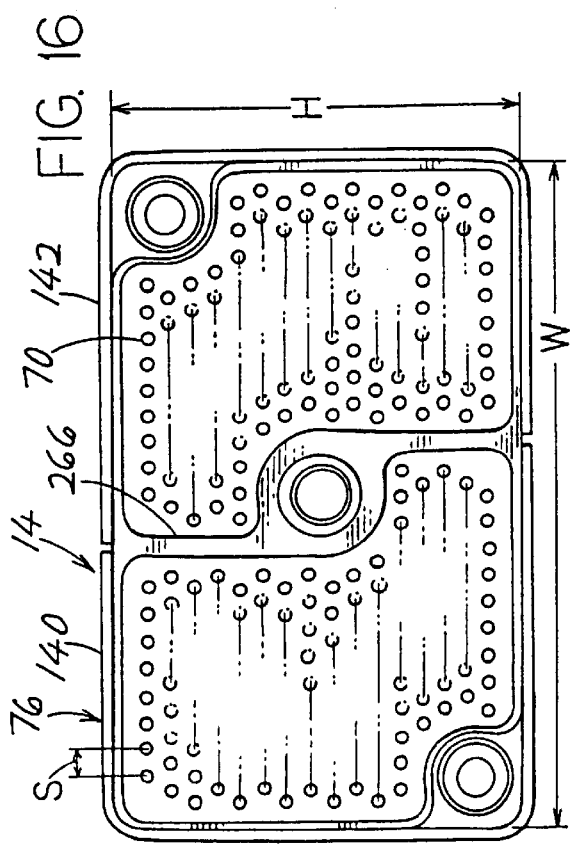
FIG. 16 is a front view of the rear connector of FIG. 2.

FIG. 16 shows the frame 76 of the rear connector 14, includes a divider 266 that is a mirror image of the divider of the front connector frame. However, the rear frames does not have any screw-holding projections because it receives but is not directly fixed to the sleeve-holding body elements.

Applicant has analyzed the design of the frame 50 of FIG. 12 and the corresponding body elements such as 54 in FIG. 23, in the course of searching for an element that best utilizes the available space. Applicant's analysis shows that a greater number of passages 42 can be accommodated by the arrangement illustrated, which includes the projection 222 from the imaginary rectangle 224, than if two short projections such as indicated at 262, 264 were used. It is noted that since the rear of each body element projects rearwardly from the front frame, that the rear frame 76 shown in FIG. 6 is provided with recesses 66 to receive the body elements, with the rear frame also having a divider 266.

FIG. 6 shows that the rear frame 76 has bracket-holding projections including a pair of such projections 270 at the top, a pair 272 at each side, and a pair 274 at the bottom. Each bracket 140, 142 is of generally U shape, with a base 280 and with a pair of legs 282, 284 extending from opposite ends of the base. Each leg has a slot 286, 288, with the base having a pair of slots 290. Each slot receives one of the projections such as 270 to retain the bracket on the shell. Each slot has a far shoulder 294 that engages a projection shoulder 296. The bracket has an inwardly-extending flange 292 at its rear, for holding the back plate 82 in place. FIG. 8 shows the bracket 140 with its upper slot 286 receiving a projection 270, and with the flange 292 pressing against the rear of the back plate 82 to prevent removal of the back plate.

The projections on the front shell 50 shown in FIG. 7, include projections 300, 302 at the top and side walls, and additional projections at the bottom. As shown in FIG. 4, each projection 300 has a far end 302 nearest the free end 304 of the bracket 166, where the projection end surface or end 302 extends close to the vertical. This prevents withdrawal of the bracket unless the top and bottom legs of the bracket are pressed apart. The near end 306 of the projection is inclined about 45° to the vertical, to allow installation of the bracket by merely pushing it over the projections until the projections snap into the slots of the bracket. Considering the projection 300 in FIG. 4, it can be said that the leftward or far end 302 of the projection extends vertically or at a small angle to the vertical, while the right or near end 304 extends at a greater incline from the vertical than does the left end.

Figure 11:
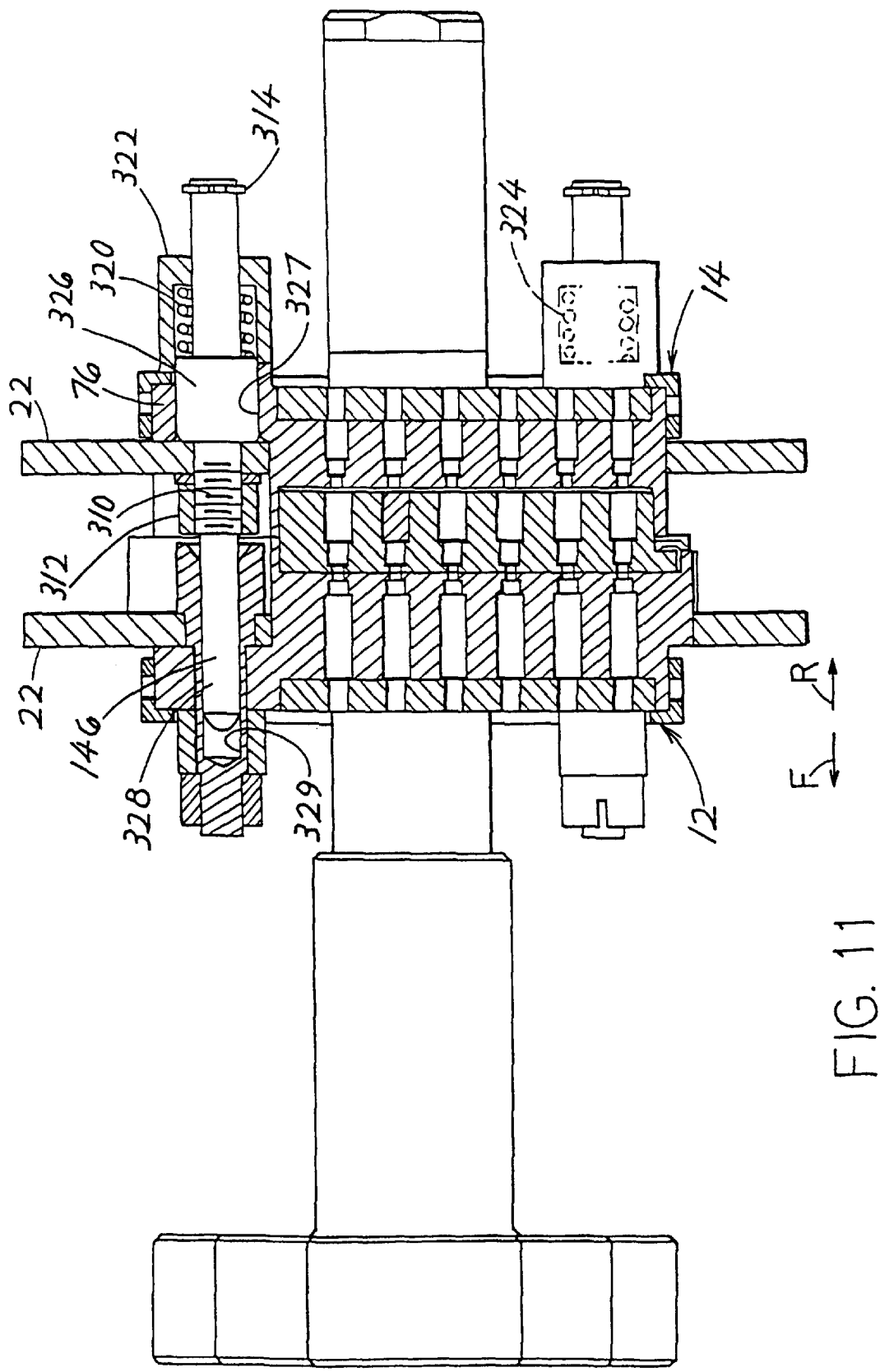
FIG. 11 is a sectional view of the mated connectors of FIG. 2, showing one of the alignment pins.
Figure 15:
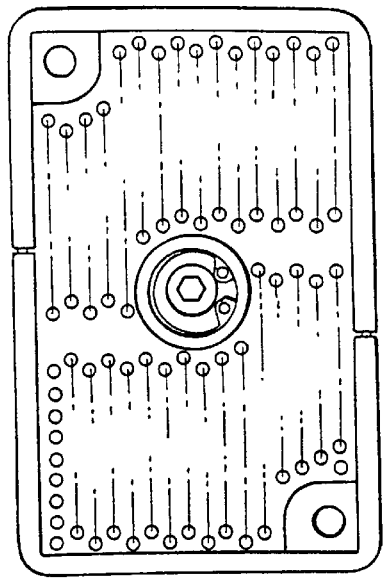
FIG. 15 is a front elevation view of the front connector with jackscrew, of FIG. 13.
Figure 14:
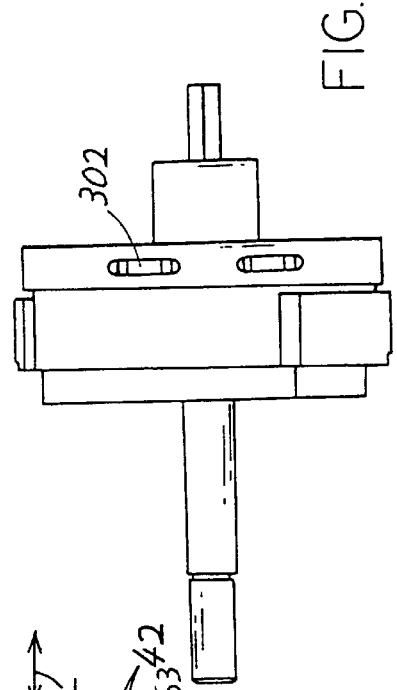
FIG. 14 is a side elevation view of the front connector and jackscrew of FIG. 12.
Figure 13:
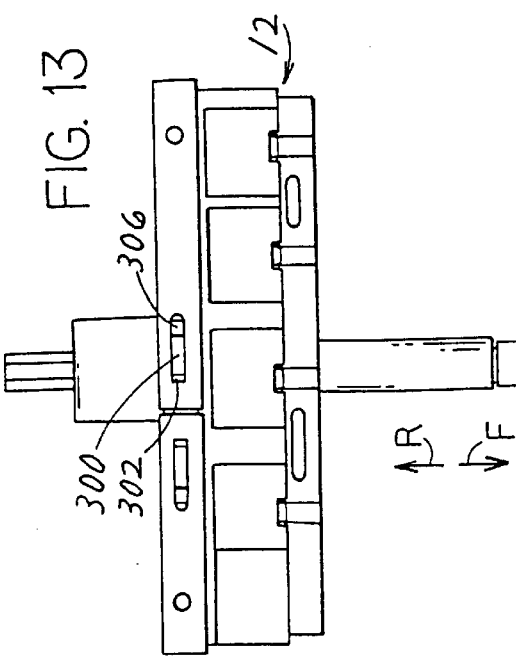
FIG. 13 is a plan view of the connector of FIG. 12, with the jackscrew but without the jackscrew handle.

FIG. 11 shows some details of an alignment pin 146, which aligns the front and rear connectors as they approach one another to mate. The alignment pin has a threaded middle 310 that screws into a nut 312 that lies against the surface of the cabinet or mount wall 22. As a result, when the rear connector 14 is removed, the alignment pin 46 remains in place. In order to remove the rear connector, a person removes a retaining ring 314, which is easily accomplished with a tool that expands it to remove it. With the jackscrew turned, the rear connector moves rearwardly away from the front connector. A spring 320 moves a portion 322 of the rear connector rearwardly, to help start the rear connector moving rearwardly by beginning to move the rear ferrules out of the alignment sleeves. The spring 320, and a corresponding spring 324 at the opposite corner of the rear connector provide initial separation while avoiding cocking of the rear connector, which helps the person to remove the rear connector. A rear guide part 326 of the guide pin is closely surrounded by the rear frame. A front guide part 328 of the guide pin is closely surrounded by walls of a bore 329 in the front connector.

Figure 17:
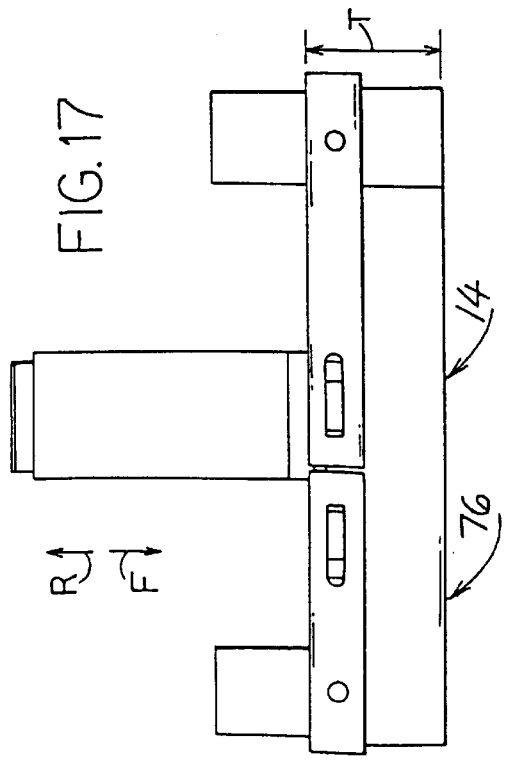
FIG. 17 is a plan view of the rear connector of FIG. 16.

In a connector assembly of the illustrated construction that applicant has designed, the rear frame (FIG. 16) had a width W of 3.26 inches (82.8 mm) and a height H of 2.061 inches (52.35 mm). The thickness T (FIG. 17) of the rear frame between the rear of the brackets and the front of the rear frame was 0.638 inch (16.2 mm). The axes of passages 70 were spaced apart by a distance S of about 0.12 inch (3 mm) along each row and along each column of passages.

While terms such as "top" and "bottom" have been used to described the relative positions of the parts, it should be understood that the connectors can be used in any orientation with respect to the Earth.

Thus, the invention provides a connector assembly which facilitates mating and unmating of front and rear connectors and which facilitates removal of the rear connector and a portion of the front connector to expose the tips of the ferrules for cleaning and maintenance. A jackscrew has a front end that can be turned and a rear end that is threadably engaged with a nut part of the rear connector, to move the rear connector forward and rearward from the front. Where the jackscrew can be manually turned, a spring urges the jackscrew forwardly, so the person turning it is informed when the rear of the jackscrew has threadably engaged the nut part on the rear connector. The rear of the jackscrew can receive a wrench to turn it from the rear, with the rear of the jackscrew projecting rearward of where the optical cables extend from the rear connector for easy access. The front connector includes a frame with a body portion having numerous passages, the front connector also having body elements with passages for holding alignment sleeves. The body elements can be removed from the rear of the front connector by removing fasteners, especially by unscrewing screws, to gain access to the front ends of the front ferrules. The rear of the front frame and the front of the rear frame have vertical dividers with an enlarged middle for passing the jackscrew and with top and bottom vertically-extending divider parts that are offset laterally from one another. Each body element is of generally rectangular shape, but with a projection near one end that projects up to an offset divider part. The body elements have projections with screw-receiving holes, and the front frame has projections with holes that receive the screws. Back plates that hold the termini in the front and rear connectors, are held in place by U-shaped brackets that receive projections on the frame. The front and rear connectors are aligned by alignment pins that lie at opposite corners of the connectors. Springs lying around the alignment pins, push the rear connector rearwardly to initially separate it from the front connector when the jackscrew is operated to unmate the connectors.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical connector comprising:
   a frame that forms a pair of longitudinally-opening and laterally-spaced cavities;
   a pair of body elements that each fits into one of said cavities, each body element having a plurality of longitudinally extending through passages;
   said frame having top and bottom walls and laterally opposite side walls, and said frame having a divider lying about halfway between said walls, said divider having vertically extending top and bottom divider parts and having a middle region that is wider than said top and bottom divider parts, said middle region having a longitudinally extending hole for receiving a fastener;
   each of said cavities has a recess on at least one side of said divider parts, the recess extending laterally beyond an adjacent side of said center region, and each of said body elements has at least one projection that projects into one of said recesses.

2. The optical connector described in claim 1 wherein:
   said middle region has laterally-spaced left and right sides, said top divider part extends upwardly from said right side of said middle region, and said bottom divider part extends downwardly from said left side of said middle region.

3. The optical connector described in claim 1 wherein:
   said top and bottom walls of said frame have fastener receiving parts with holes, said fastener receiving parts projecting respectively upwardly and downwardly at said top and bottom frame walls to lie respectively above and below adjacent portions of said top and bottom frame walls;
   each of said body elements has top and bottom walls with projections thereat that have fastener receiving holes therein that are each aligned with the hole in one of said fastener receiving parts; and including
   a plurality of fasteners that each projects through a hole in one of said projections and a hole in a corresponding one of said fastener receiving parts.

4. An optical connector comprising:
   a frame that has a plurality of longitudinally-extending passage parts for receiving termini, and that forms at least one longitudinally-opening cavity;
   at least one body element that fits into said cavity, said body element having a plurality of longitudinally-extending through passage parts that are aligned with passage parts of said frame;
   said frame having top and bottom walls with fastener-receiving frame holes therein, and said body element having fastener-receiving body holes aligned with said frame holes;
   a plurality of fasteners that each project through one of said frame holes and one of said body holes, and which holds said body element to said frame;
   said frame having a plurality of outward body projections at said top and bottom frame holes, and said body element having a top and bottom with outward projections therein forming said body holes, said top projections extending above adjacent portions of said top frame walls and said bottom projections extend below adjacent portions of said bottom frame walls.

5. The optical connector described in claim 4 wherein:
   said at least one cavity includes a pair of longitudinally-opening cavities;
   said at least one body element includes a pair of body elements that each fits into one of said cavities, each body element having a plurality of longitudinally extending through passages;
   said frame has top and bottom walls and laterally opposite side walls, and said frame has a divider lying about halfway between said side walls, said divider having vertically extending top and bottom divider parts and having a middle region that is wider than said top and bottom divider parts, said middle region having a longitudinally extending hole for receiving a jackscrew;
   each of said body elements has an outer side lying adjacent to said one of said frame side walls, and has an inner side lying adjacent to said divider, with each inner side of a body element having a sideward recess that receives a side of said middle region and with each inner side having a projecting inner side portion that lies against one of said divider parts, with at least some of said passage parts lying in said projecting inner side portion.

6. An optical connector, comprising:
   a frame having longitudinally-spaced faces and having a plurality of passage parts extending longitudinally between said faces, said connector comprising a backplate which has a front face that lies against one of said body faces and which has a back face, said backplate having a plurality of passage parts aligned with said passage parts in said frame, wherein:
   said frame has an outer surface with a plurality of projections thereon, said projections having far ends forming shoulders; and including
   a pair of brackets that each have a largely U shape with a base and a pair of legs extending from opposite ends of the base, each leg including a slot that receives one of said projections, with each slot having a far end that engages a far shoulder of one of said projections;
   each of said brackets has a flange that lies against the back face of said backplate;
   said legs being resiliently deflectable apart to ride over said projections and to move together to receive said projections.

7. The optical connector described in claim 6 wherein:
   the base of each said brackets has a slot which receives one of said projections.

8. The connector described in claim 6 wherein;
   each of said legs is elongated in a horizontal direction and said base extends vertically between said legs;
   each of said projections has far and near ends, with said far end having a surface extending closer to the vertical than said near end.

9. An connector assembly which includes front and rear connectors, each connector having a body with a plurality of longitudinally-extending termini-receiving through passages arranged in a plurality of laterally-extending rows and vertically-extending columns, said connectors having mating faces that abut one another when the connector mate and said connectors having alignment pins and bores that engage to align the passages of the two connectors , wherein:

each connector has a top and bottom, laterally opposite sides and a center halfway between said top and bottom and between said sides, with said center having a bore extending longitudinally through the connector;

said front connector has a jackscrew extending through its bore, said jackscrew has a front end constructed to receive torque to turn said jackscrew and said jackscrew has a threaded rear end, and said rear connector has a threaded nut part aligned with its bore to receive said jackscrew rear end in threadable engagement, so the jackscrew can be turned to move said connectors together and apart;

said jackscrew rear end has a noncircular wrench-receiving part that is accessible from the rear of said rear connector and that can pass at least partially through said nut, for receiving a wrench to enable a technician to turn said jackscrew form a location rearward of said rear connector.

10. The connector assembly described in claim 9 wherein:

said front and rear connectors each has a pair of said bores and said alignment pins each have front and rear ends that are each slideable in said bores in said front and rear connectors;

said alignment pins each have middle portions, and including a pair of retainers that are each fixable to one of said middle portions and that abut one of said mount walls, to prevent rearward movement of said alignment pins.

11. The connector assembly described in claim 9 wherein:

said termini-receiving passages in said rear connector have termini passage rear ends;

said jackscrew rear end and said nut part, each extend rearward of said termini passage rear ends, to thereby enable easier access to said jackscrew when optic cables extend rearwardly out of said termini passages of said rear connector.

\* \* \* \* \*